UNITED STATES PATENT OFFICE.

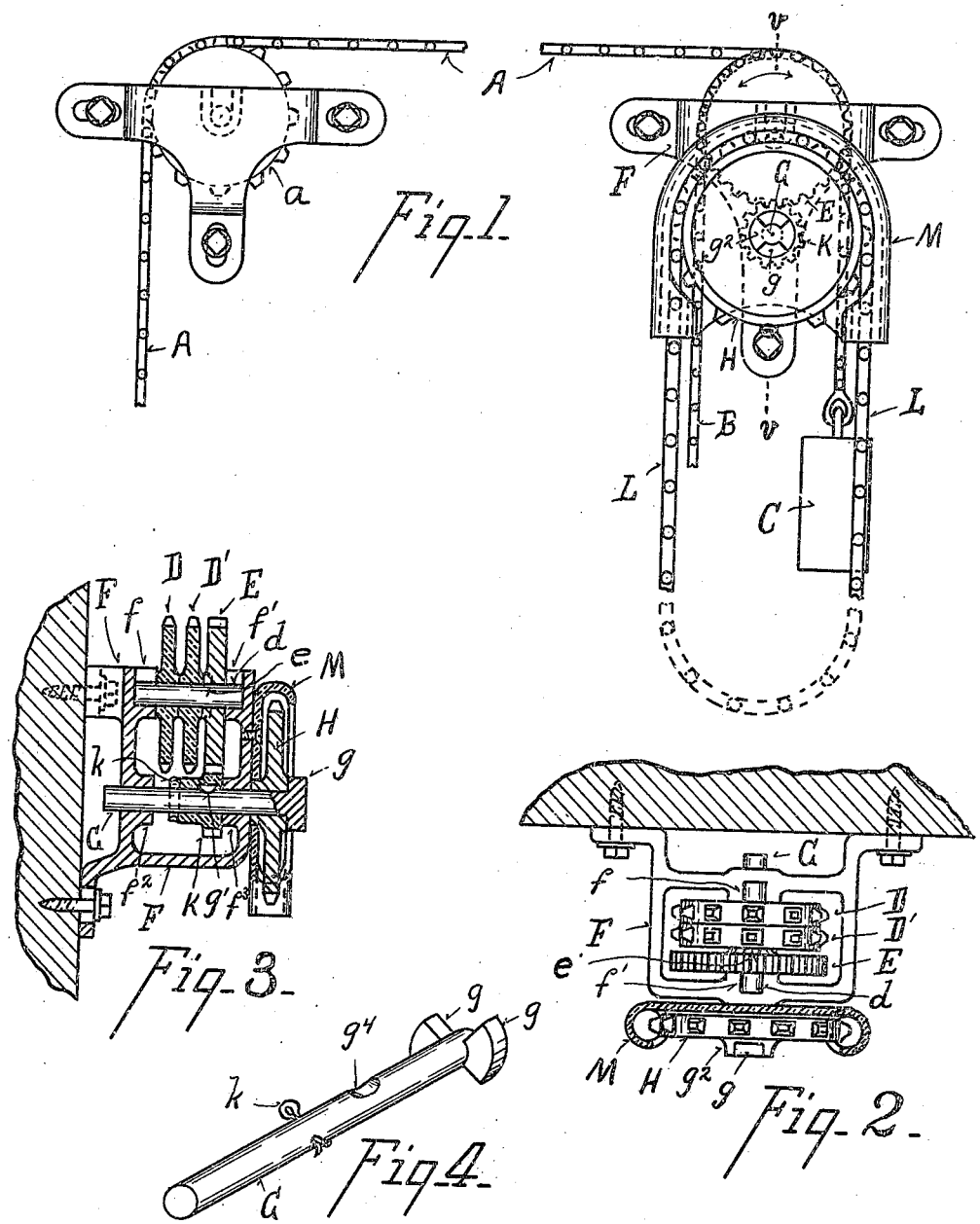

ADAM RITTER, OF CINCINNATI, OHIO, ASSIGNOR TO THE RITTER FOLDING DOOR COMPANY, OF COVINGTON, KENTUCKY, A CORPORATION OF KENTUCKY.

DOOR-OPERATING MECHANISM.

952,713.  Specification of Letters Patent.  Patented Mar. 22, 1910.

Application filed July 12, 1909. Serial No. 507,196.

*To all whom it may concern:*

Be it known that I, ADAM RITTER, a citizen of the United States, residing at Cincinnati, in the county of Hamilton and State of Ohio, have invented certain new and useful Improvements in Door-Operating Mechanism, of which the following is a specification.

My invention relates to improvements in mechanism for opening, closing and counterweighting heavy doors.

One of its objects is to provide mechanism capable of ready and convenient assembly, and access.

Another object is to provide inexpensive mechanism of minimum parts.

It further consists in certain details of form, combination and arrangement, all of which will be more fully set forth in the description of the accompanying drawings, in which:

Figure 1 is a front elevation of my improved mechanism in position for use. Fig. 2 is a top plan view of the same. Fig. 3 is a vertical section on line $v$ $v$ of Fig. 1. Fig. 4 is a perspective view of one of the journal pins or shafts.

My improved mechanism is particularly adapted for use with the class of doors illustrated in Letters Patent of the United States No. 856,369, granted June 11, 1907, but is capable of use in connection with other doors, and for like purposes.

In the form illustrated in the drawings, A B represent sprocket chains attached at one end to opposite sides of the lower portion of the door to be operated. At the opposite end chains A B are preferably jointly attached to a counterweight C, although independent weights may be employed in place of a joint weight. The chain A passes first over an idle pulley $a$ and thence over a sprocket wheel D and thence to the counterweight C. Chain B passes from the door directly over sprocket wheel D' and thence to counterweight C.

The sprocket wheels D D' and a spur gear E are all rigidly mounted upon a stud shaft $d$ which is supported and journaled at opposite ends in sockets or bearings $f$ $f'$ formed in the frame or bracket F. The bearings $f$ $f'$ are closed at the ends to limit the endwise movement of shaft $d$, but are open at the top so that said shaft and its gears D D' E may be dropped into position and lifted out as desired. I preferably rigidly attach the wheels D D' to the shaft $d$ by a pin or key, or by a drive fit, and provide a clutch member on the hub of the wheel D' to interlock with a clutch member $e$ on the hub of the gear E to lock the gear E to the wheels D D', as I am thus enabled to readily substitute transmitting gears of different ratio on the respective shafts, depending upon the weight or size of the door or other object to be actuated.

A shaft G is adapted to be inserted endwise into circular bearings $f^2$ $f^3$ formed in the bracket F. Shaft G is provided at one end with a clutch member $g$ preferably formed integral therewith and is provided with a key seat $g^4$ to receive a key $g'$. A sprocket wheel H having a counterpart $g^2$ of the clutch $g$ formed in its hub is located in front of the bracket F. The key $g'$ serves to lock a spur gear K to shaft G, and a pin $k$ serves to hold the shaft G in place in its bearings $f^2$ $f^3$, and to hold the clutch members $g$ $g^2$ in engagement and the gear K in engagement with its key $g'$ and thereby locked to shaft G.

L represents a sprocket chain adapted to be operated by hand and by means of which the sprocket wheel H may be turned. The wheel H through shaft G turns spur gear K which is in mesh with and turns spur gear E carrying with it wheels D D' to feed the chains A B in either direction to open or close the door to which said chains are to be attached.

M represents a guide or guard for the chain L to hold the same in place upon the wheel H, guide M being attached to the front of bracket F.

I am thus enabled to lift out and readily secure access to the parts D D' E, $d$, and their bearings $f$ $f'$, and by removing pin $k$ to detach and secure access to parts G, H, K and bearings $f^2$ $f^3$ and to quickly and securely assemble said several parts as required, and to greatly reduce the first cost, and the time required in assembling.

The mechanism herein illustrated and described is capable of considerable modification without departing from the principle of my invention.

Having described my invention what I claim is:

1. In a mechanism of the character indicated, a supporting frame, a driven shaft detachably supported in bearings in the upper portion of said frame, a chain driving pulley and a transmitting gear carried rigidly by said shaft, a driving shaft journaled near opposite ends in bearings in the lower portion of said frame, a clutch member carried by said driving shaft, a driving pulley carried by said driving shaft and having a clutch member adapted to interlock with the clutch member of said driving shaft, a transmitting gear carried by said driving shaft in position to engage and drive the transmitting gear on said driven shaft, and means to detachably lock said driving shaft to position endwise to hold said clutch members in engagement, and to hold the transmitting gear carried by said driving shaft laterally in position.

2. In a mechanism of the character described, a supporting frame, a driven shaft supported at opposite ends in bearings in the upper portion of said frame, a plurality of chain driving pulleys and a transmitting gear carried rigidly by said shaft, bearings in the lower portion of said frame, a driving shaft adapted to be inserted endwise into said bearings, a clutch member carried by said driving shaft, a driving pulley carried by said driving shaft and having a clutch member adapted to interlock with the clutch member of said driving shaft, a transmitting gear carried by said driving shaft in position to drive the transmitting gear on said driven shaft, and means to detachably lock said driving shaft to position endwise to hold said clutch members in engagement and to hold the transmitting gear carried by said driving shaft laterally in position.

3. In a mechanism of the character described, a supporting frame, a driven shaft supported at opposite ends by socket shaped bearings carried by said frame, and adapted to be lifted from and inserted into said bearings, a plurality of chain driving pulleys and a transmitting gear carried rigidly by said shaft, bearings in said frame adapted to receive endwise a driving shaft, and to support opposite ends thereof said driving shaft carrying a driving pulley and a transmitting gear, said transmitting gear being detachably connected to said driving shaft intermediate of its bearings, and in engagement with the transmitting gear on said driven shaft, and means to lock said driving shaft against endwise displacement.

4. In a mechanism of the character described, a supporting frame, a driven shaft supported at opposite ends in cup shaped bearings carried by said frame, and adapted to be lifted from and inserted into said bearings, a plurality of chain driving pulleys carried rigidly by said shaft, a clutch member carried by one of said chain driving pulleys, a transmitting gear mounted on said shaft and provided with a clutch member adapted to interlock with the clutch member of said chain driving pulley, and to be held in the interlocked position by said frame when said shaft is seated in its bearings, a driving shaft journaled near opposite ends in bearings in the lower portion of said frame, said driving shaft carrying a driving pulley and a transmitting gear, said transmitting gear being in engagement with the transmitting gear on said driven shaft, and means to lock said driving shaft against endwise displacement.

5. In a mechanism of the character described, a supporting frame, a driven shaft supported at opposite ends in open bearings in the upper portion of said frame, a plurality of chain driving pulleys and a transmitting gear carried rigidly by said shaft, a driving shaft supported near opposite ends in bearings in the lower portion of said frame, a clutch member carried by said driving shaft, a driving pulley carried by said driving shaft and having a clutch member adapted to interlock with the clutch member of said driving shaft, a transmitting gear carried by said driving shaft in position to drive the transmitting gear on the driven shaft, and means to detachably lock said driving shaft to position endwise to hold said clutch members in engagement, and to hold the transmitting gear on said driving shaft laterally in position.

In testimony whereof I have affixed my signature in presence of two witnesses.

ADAM RITTER.

Witnesses:
WALTER F. MURRAY,
C. W. MILES.